United States Patent
Zhang

(10) Patent No.: US 12,426,022 B2
(45) Date of Patent: Sep. 23, 2025

(54) METHODS, APPARATUS AND SYSTEMS FOR TRANSMITTING INDICATION INFORMATION

(71) Applicant: ZTE CORPORATION, Guangdong (CN)

(72) Inventor: Chenchen Zhang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 937 days.

(21) Appl. No.: 17/168,937

(22) Filed: Feb. 5, 2021

(65) Prior Publication Data
US 2021/0160875 A1   May 27, 2021

Related U.S. Application Data

(63) Continuation of application No. PCT/CN2018/099581, filed on Aug. 9, 2018.

(51) Int. Cl.
| | |
|---|---|
| *H04W 72/04* | (2023.01) |
| *H04L 5/00* | (2006.01) |
| *H04W 40/24* | (2009.01) |
| *H04W 72/0453* | (2023.01) |
| *H04W 74/0833* | (2024.01) |

(52) U.S. Cl.
CPC ....... *H04W 72/0453* (2013.01); *H04L 5/0048* (2013.01); *H04W 40/248* (2013.01); *H04W 74/0833* (2013.01)

(58) Field of Classification Search
CPC ........... H04W 72/0453; H04W 40/248; H04W 74/0833; H04W 72/27; H04L 5/0048
See application file for complete search history.

(56) References Cited

U.S. PATENT DOCUMENTS

| | | | |
|---|---|---|---|
| 2015/0256403 A1 | 9/2015 | Li | |
| 2017/0041971 A1* | 2/2017 | Kim | H04W 76/14 |
| 2017/0078953 A1* | 3/2017 | You | H04L 5/0048 |
| 2017/0295601 A1* | 10/2017 | Kim | H04W 72/20 |
| 2018/0183551 A1* | 6/2018 | Chou | H04W 74/006 |

(Continued)

FOREIGN PATENT DOCUMENTS

| | | |
|---|---|---|
| CN | 101998652 A | 3/2011 |
| CN | 102196581 A | 9/2011 |

(Continued)

OTHER PUBLICATIONS

CATT: "Consideration on startup procedure for L2 IAB architecture", 3GPP TSG RAN WG2 Meeting #101bis, R2-1804492, Sanya, China, Apr. 16-20, 2018, 4 pages.

(Continued)

*Primary Examiner* — Shukri Taha
(74) *Attorney, Agent, or Firm* — Foley & Lardner LLP

(57) ABSTRACT

Methods, apparatus and systems for transmitting indication information in a wireless communication are disclosed. In one embodiment, a method performed by a first wireless communication node is disclosed. The method comprises: transmitting indication information to a second wireless communication node, in connection with an establishment of a first link between the first wireless communication node and the second wireless communication node, for determining at least one transmission resource configuration to be used on the first link.

15 Claims, 6 Drawing Sheets

(56) References Cited

U.S. PATENT DOCUMENTS

| | | | |
|---|---|---|---|
| 2018/0199359 A1* | 7/2018 | Cao | H04L 1/1896 |
| 2019/0230714 A1 | 7/2019 | Liu | |
| 2019/0394825 A1* | 12/2019 | Byun | H04W 8/08 |
| 2020/0008250 A1* | 1/2020 | Wang | H04W 72/27 |
| 2023/0261838 A1* | 8/2023 | Dai | H04B 7/18513 370/326 |

FOREIGN PATENT DOCUMENTS

| | | | |
|---|---|---|---|
| CN | 102387595 A | 3/2012 | |
| CN | 102696275 A | 9/2012 | |
| CN | 108235444 A | 6/2018 | |
| CN | 108307413 A | 7/2018 | |
| WO | WO-2012136058 A1 * | 10/2012 | H04L 27/26 |
| WO | 2017135877 A1 | 8/2017 | |
| WO | 2017194003 A1 | 11/2017 | |
| WO | 2018119851 A1 | 7/2018 | |

OTHER PUBLICATIONS

ZTE: "Discussion on IAB node access procedure", 3GPP TSG RAN WG2 Meeting #102, R2-1807401, Busan, Korea, May 21-25, 2018, 5 pages.

AT&T: "TP for 38.874 capturing RAN1 agreements on IAB", 3GPP TSG RAN WG1 Meeting #93, R1-1807850, Busan, Korea, May 21-25, 2018, 8 pages.

ZTE: "Overview of physical layer enhancements for IAB", 3GPP TSG RAN WG1 Meeting #93, R1-1806024, Busan, Korean, May 12, 2018 (May 12, 2018), 9 pages.

\* cited by examiner

METHODS, APPARATUS AND SYSTEMS FOR TRANSMITTING INDICATION INFORMATION

TECHNICAL FIELD

This disclosure relates generally to wireless communications and, more particularly, to methods, apparatus and systems for transmitting indication information for determining a transmission resource configuration in a wireless communication.

BACKGROUND

Relay technology is one of the main technologies adopted by the long term evolution advanced (LTE-A) system, and can effectively expand network coverage, improve cell edge data rate, and avoid the construction of wired transmission networks by using wireless backhauls, which can be quickly deployed to reduce the construction of operators and save operating costs. For the frame structure design in the LTE-A relay technology, a time-division half-duplex scheme is adopted based on fake multicast broadcast single frequency network (MBSFN) sub-frames. That is, some fake MBSFN sub-frames are configured for backhaul link transmission based on an MBSFN sub-frame configuration, while non-MBSFN sub-frames are used for access link transmission, which leads to time division duplexing of the backhaul link and the access link and is completely transparent to the terminal.

Relay technology will be further utilized in the fifth generation (5G) new radio (NR) network and its subsequent evolution versions. For example, the IAB (Integrated Access and Backhaul) technology in the 5G NR network can further support a multi-hop relay system, where the network topology also supports redundant connections. In a multi-hop relay system, if the quality of a link between a relay node and its upper parent node is poor, the relay node needs to access a new parent node, with respect to which the relay node is a child node. The relay node itself can also be a parent node for one or more subordinate child nodes that may include terminals or other relay nodes.

Different links in a wireless system may be multiplexed based on one or more multiplexing schemes. As such, after the relay node accesses the new parent node, the new link between the new parent node and the relay node may use different time, frequency and/or space resources from those used by the old link between the old parent node and the relay node. The time, frequency and/or space resources used on the new link may conflict with the transmission resources used on the subordinate link(s) between the relay node and the subordinate nodes, making the subordinate link(s) unavailable to use due to resource conflicts. Therefore, in an existing method for accessing a new parent node by a relay node, the transmission resources of the subordinate links may need to be reconfigured, or the subordinate child node(s) of the relay node need to access a new parent node.

Thus, existing systems and methods for accessing a new parent node in a wireless communication are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a first wireless communication node is disclosed. The method comprises: transmitting indication information to a second wireless communication node, in connection with an establishment of a first link between the first wireless communication node and the second wireless communication node, for determining at least one transmission resource configuration to be used on the first link.

In another embodiment, a method performed by a first wireless communication node is disclosed. The method comprises: receiving indication information from a second wireless communication node, in connection with an establishment of a first link between the first wireless communication node and the second wireless communication node, for determining at least one transmission resource configuration to be used on the first link.

In a different embodiment, a wireless communication node configured to carry out a disclosed method in some embodiment is disclosed.

In yet another embodiment, a non-transitory computer-readable medium having stored thereon computer-executable instructions for carrying out a disclosed method in some embodiment is disclosed.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Figure 1:
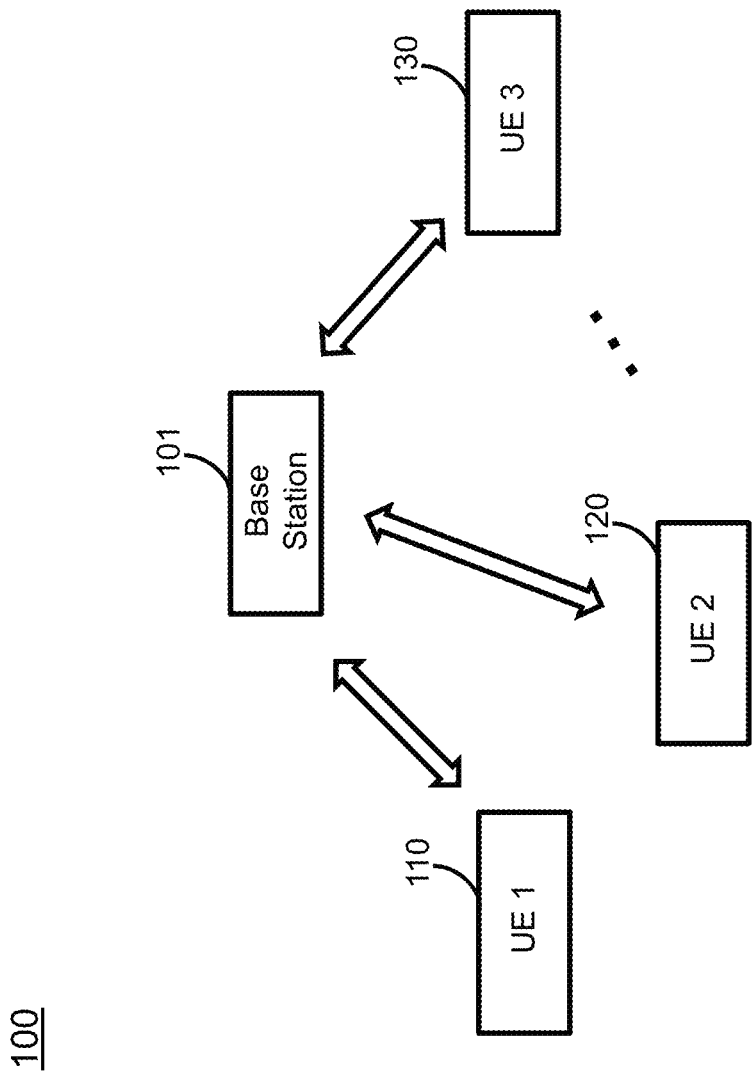
FIG. 1 illustrates an exemplary communication network in which techniques disclosed herein may be implemented, in accordance with an embodiment of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "B S") that each provides geographical radio coverage, and one or more wireless user equipment devices (typically known as a "UE") that can transmit and receive data within the radio coverage. In the wireless communication network, a BS and a UE can communicate with each other via a communication link, e.g., via a downlink radio frame from the BS to the UE or via an uplink radio frame from the UE to the BS. In a multi-hop relay system, one or more relay nodes may be deployed between a BS and a UE on each branch of the multi-hop relay system. Due to a failure of handover or radio link, a relay node may need to disconnect the old link with the old parent node and switch to a new parent node. If the relay node itself also serves its own child relay node or terminal, once the relay node rushes to access the new parent node by a new link, the new link may adopt a different resource multiplexing mode or a different resource from that of the old link, which may render the links between the relay node and its subordinate relay nodes or terminals unable to continue to use their previous resource multiplexing modes or previous resources. In this case, a reconfiguration of resource multiplexing modes or re-allocation of resources is needed for these links.

In order to avoid the above-mentioned failure of the subordinate links and the need to re-allocate resources due to the failure of the old links, the present disclosure provides methods, apparatus and systems for transmitting indication information in a wireless communication system, to efficiently coordinate the transmission resources of the new link and the subordinate link to avoid resource conflicts as much as possible. In one embodiment, a relay node can transmit indication information to a new parent node, during or after an establishment of a new link between the two nodes. The indication information may comprise information about the relay node, the parent node, and/or the new link, to indicate multiplexing modes and/or transmission resources desired by the relay node based on existing multiplexing modes and/or transmission resources used by subordinate links of the relay node. After analyzing the indication information, the parent node may transmit a feedback to the relay node to agree and disagree with the proposed multiplexing modes and/or transmission resources in the indication information. If the parent node agrees, the relay node can determine at least one transmission resource configuration to be used on the new link based on the feedback. If the parent node disagrees, the relay node can re-transmit the indication information to the parent node after a modifiable delay of a time period, transmit the indication information to another parent node, or stop transmitting the indication information. According to various embodiments, the disclosed system and method can reduce impacts on the existing multiplexing modes and/or transmission resources used by the remaining links in the same branch of the multi-hop relay system, based on the information exchange between the relay node and the new parent node during or after the random access process between the two nodes.

In various embodiments, a BS is referred to as a network side node and can include, or be implemented as, a next Generation Node B (gNB), an E-UTRAN Node B (eNB), a Transmission/Reception Point (TRP), an Access Point (AP), a donor node (DN), etc. A UE in the present disclosure can be referred to as a terminal and can include, or be implemented as, a mobile station (MS), a station (STA), etc. A relay node (RN) may have functions similar to those of a BS and/or functions similar to those of a UE. A BS and a RN may be described herein as non-limiting examples of "wireless communication nodes;" and a UE may be described herein as non-limiting examples of "wireless communication devices." The BS, RN, and UE can practice the methods disclosed herein and may be capable of wireless and/or wired communications, in accordance with various embodiments of the present disclosure. In an exemplary multi-hop relay system having a branch comprising BS→RN1→RN2→UE, the BS is the parent node (PN) of RN1, which is the PN of RN2, which is in turn the PN of UE, while the UE is the child node/device of RN2, which is the child node (CN) of RN1, which is in turn the CN of BS.

FIG. 1 illustrates an exemplary communication network 100 in which techniques disclosed herein may be implemented, in accordance with an embodiment of the present disclosure. As shown in FIG. 1, the exemplary communication network 100 includes a base station (BS) 101 and a plurality of UEs, UE 1 110, UE 2 120 . . . UE 3 130, where the BS 101 can communicate with the UEs according to wireless protocols. In some embodiments, one or more relay nodes can be deployed between the BS 101 and each UE.

Figure 2:
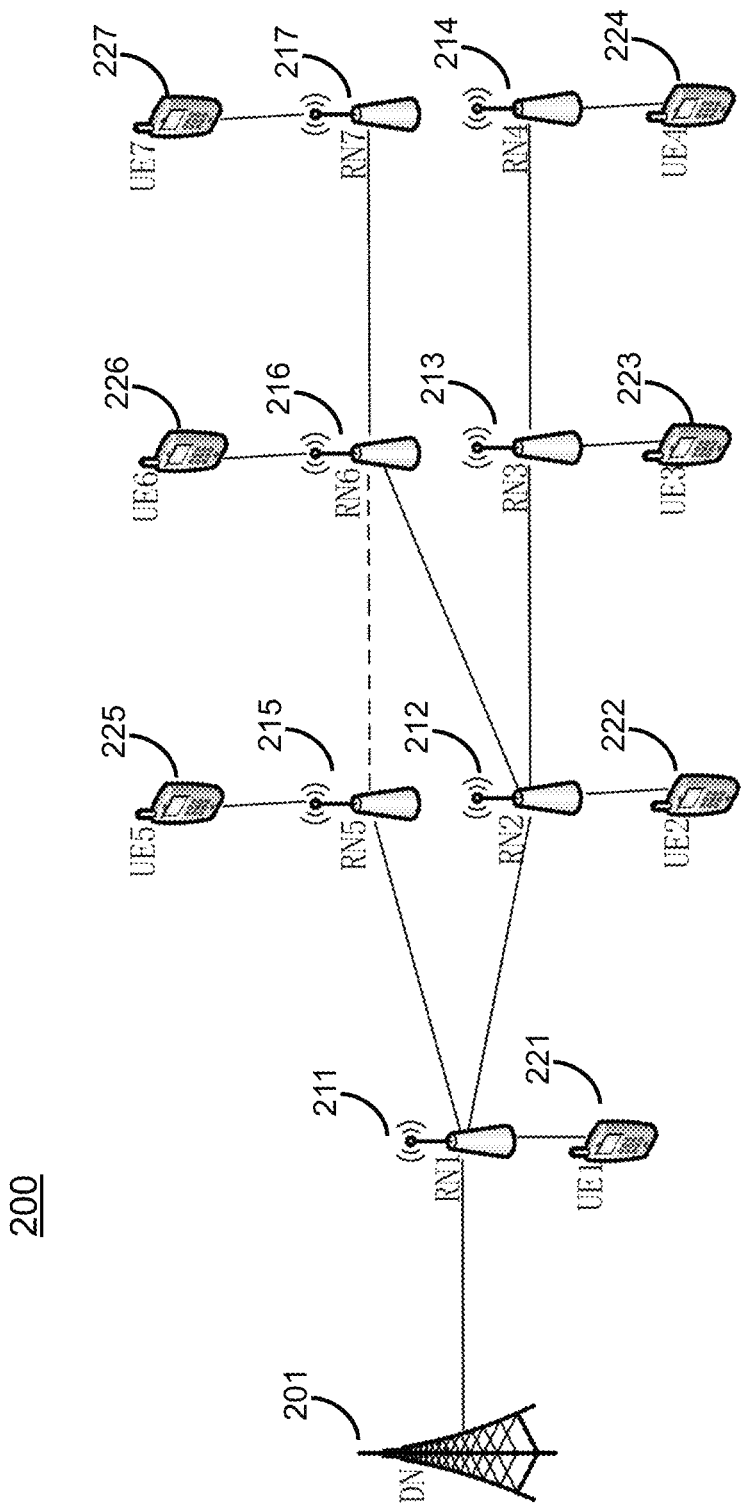
FIG. 2 illustrates an exemplary multi-hop relay system in which techniques disclosed herein may be implemented, in accordance with an embodiment of the present disclosure.

FIG. 2 illustrates an exemplary multi-hop relay system 200 in which techniques disclosed herein may be implemented, in accordance with an embodiment of the present disclosure. As shown in FIG. 2, the exemplary multi-hop relay system 200 includes a donor node (DN) 201 connected with a relay node 1 (RN1) 211. That is, the DN 201 is the parent node of the RN1 211. The RN1 211 is the child node of the DN 201. In addition, the RN1 211 is also the parent node of RN2 212 and RN5 215, while each of RN2 212 and RN5 215 has subordinate child relay nodes as well. Each relay node may also have a directly connected UE. For example, RN1 is directly connected to UE1 221, RN2 is directly connected to UE2 222 . . . RN7 is directly connected to UE7 227.

In one embodiment, the link between the child node RN6 216 and the old parent node RN5 215 fails because of handover or link failure or other reasons. As such, RN6 216 needs to disconnect with the old parent node RN5 215, and access a new parent node, e.g. RN2 212. Before RN6 216 accesses RN2 212, the RN6 216 itself is the parent node of RN7 217, and UE6 226 is connected under the RN6 216. When there is no indication or coordination between the RN6 216 and the RN2 212, the transmission resource to be used on the new link between the RN6 216 and the RN2 212 may conflict with the transmission resource being used on any of the subordinate links of the RN6 216, i.e. the link between RN6 216 and RN7 217, with the transmission resource being used on the link between RN6 216 and UE6 226, and/or even with the transmission resource being used on the link between RN7 217 and UE7 227. As such, in a disclosed system and method, RN6 216 and RN2 212 can exchange information to determine multiplexing mode and transmission resource to be used on the new link without conflicting with the multiplexing modes and transmission resources being used on the subordinate links of the RN6 216. In one embodiment, the RN5 215 instructs the RN6 216 to connect to a new parent node. In another embodiment, the RN6 216 itself initiates a connection to a new parent node.

Figure 3:
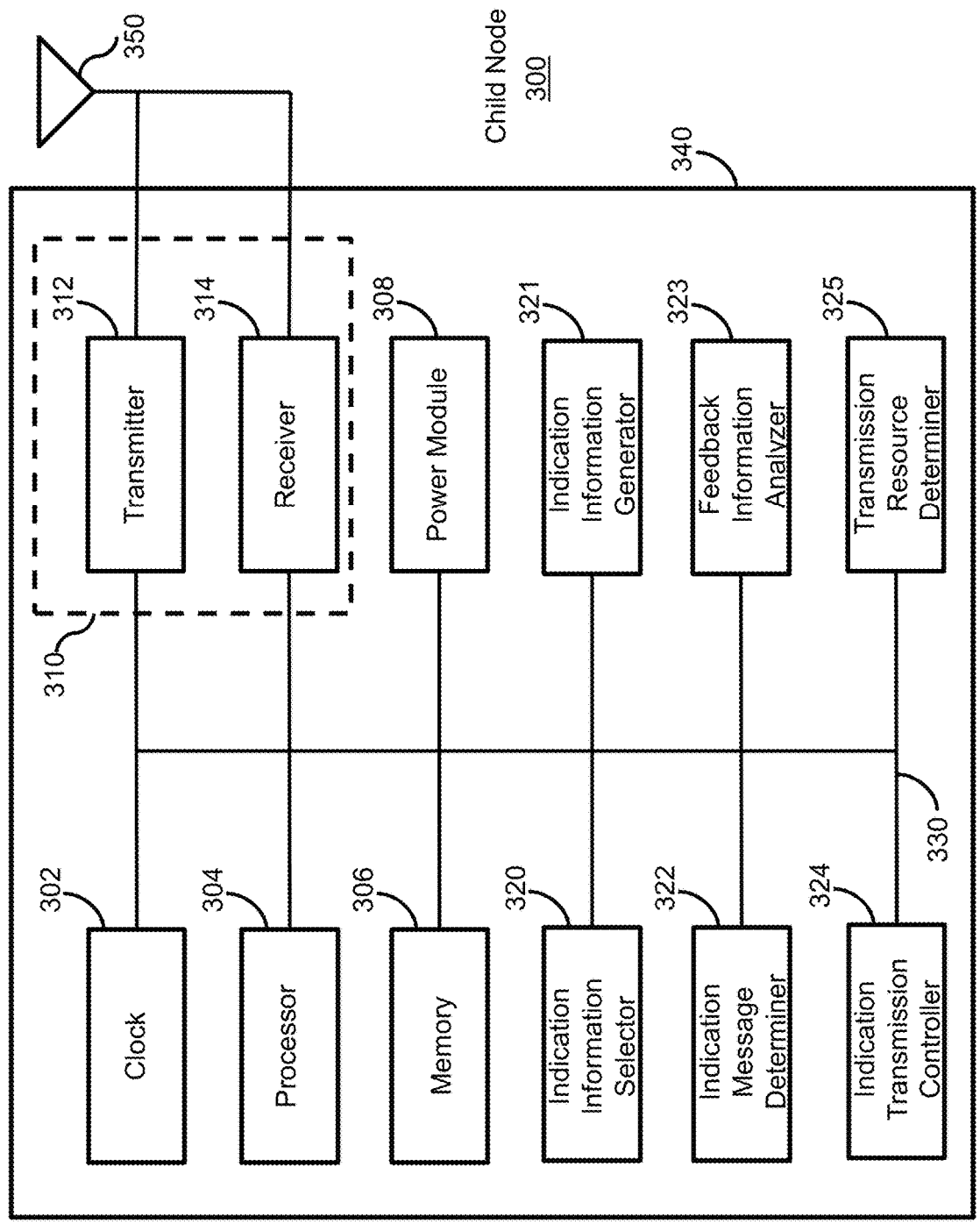
FIG. 3 illustrates a block diagram of a child node (CN), in accordance with some embodiments of the present disclosure.

FIG. 3 illustrates a block diagram of a child node (CN) 300, in accordance with some embodiments of the present disclosure. The CN 300 is an example of a device that can be configured to implement the various methods described herein. As shown in FIG. 3, the CN 300 includes a housing 340 containing a system clock 302, a processor 304, a memory 306, a transceiver 310 comprising a transmitter 312 and receiver 314, a power module 308, an indication information selector 320, an indication information generator 321, an indication message determiner 322, a feedback information analyzer 323, an indication transmission controller 324, and a transmission resource determiner 325.

In this embodiment, the system clock 302 provides the timing signals to the processor 304 for controlling the timing of all operations of the CN 300. The processor 304 controls the general operation of the CN 300 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 306, which can include both read-only memory (ROM) and random access memory (RAM), can provide instructions and data to the processor 304. A portion of the memory 306 can also include non-volatile random access memory (NVRAM). The processor 304 typically performs logical and arithmetic operations based on program instructions stored within the memory 306. The instructions (a.k.a., software) stored in the memory 306 can be executed by the processor 304 to perform the methods described herein. The processor 304 and memory 306 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 310, which includes the transmitter 312 and receiver 314, allows the CN 300 to transmit and receive data to and from a remote device (e.g., a BS, a RN, or a UE).

An antenna 350 is typically attached to the housing 340 and electrically coupled to the transceiver 310. In various embodiments, the CN 300 includes (not shown) multiple transmitters, multiple receivers, and multiple transceivers. In one embodiment, the antenna 350 is replaced with a multi-antenna array 350 that can form a plurality of beams each of which points in a distinct direction. The transmitter 312 can be configured to wirelessly transmit packets having different packet types or functions, such packets being generated by the processor 304. Similarly, the receiver 314 is configured to receive packets having different packet types or functions, and the processor 304 is configured to process packets of a plurality of different packet types. For example, the processor 304 can be configured to determine the type of packet and to process the packet and/or fields of the packet accordingly.

In a multi-hop relay system, the CN 300 may be a relay node, a terminal, or a UE. To access a new parent node without resource conflict, the CN 300 can transmit indication information to the new parent node (PN). In one embodiment, the indication information generator 321 may generate and transmit, via the transmitter 312, indication information to the new PN, during or after an establishment of a first link between the CN 300 and the PN, for determining at least one transmission resource configuration to be used on the first link. The at least one transmission resource configuration to be used on the first link is determined to avoid an interference between the first link and a second link that has been established between the CN 300 and another relay node or a terminal. The indication information may comprise information about at least one of the following: the CN 300, the PN, and the first link. The PN may be a core network, a base station, or a relay node.

In one embodiment, the indication information comprises information about at least one of the following: a multiplexing mode indication; a time domain resource indication; a frequency domain resource indication; a space domain resource indication; a hop count indication; and a node type indication. The multiplexing mode indication may indicate at least one of: at least one multiplexing mode supported by the first link, at least one multiplexing mode not supported by the first link, at least one multiplexing mode desired by the CN 300, and at least one multiplexing mode not desired by the CN 300. The time domain resource indication indicates at least one of: at least one time domain resource configuration supported by the first link, at least one time domain resource configuration not supported by the first link, at least one time domain resource configuration desired by the CN 300, and at least one time domain resource configuration not desired by the CN 300. The frequency domain resource indication indicates at least one of: at least one frequency domain resource configuration supported by the first link, at least one frequency domain resource configuration not supported by the first link, at least one frequency domain resource configuration desired by the CN 300, and at least one frequency domain resource configuration not desired by the CN 300. The space domain resource indication indicates at least one of: at least one space domain resource configuration supported by the first link, at least one space domain resource configuration not supported by the first link, at least one space domain resource configuration desired by the CN 300, and at least one space domain resource configuration not desired by the CN 300. The hop count indication indicates at least one of: hop count information of the CN 300, and hop count information of the PN; and hop count information of the first link. The node type indication indicates at least one of: a node type of the CN 300, and a node type of the PN.

The multiplexing mode indication may indicate, based on an available multiplexing mode set, at least one of or a combination of at least two of the following multiplexing modes: time division multiplexing (TDM), frequency division multiplexing (FDM), and space division multiplexing (SDM). The available multiplexing mode set is determined based on at least one of: a semi-static configuration by an upper node of the CN 300 and a pre-definition of the system. The upper node of the CN 300 may be any node at an upper position in the same branch of the CN 300. For example, the upper node may be the new PN of the CN 300. The time domain resource indication may indicate, based on an available time domain resource set, one or more consecutive or non-continuous time domain resource units that include at least one of the following: a radio frame, a half-frame, a sub-frame, a time slot, a mini-slot, an orthogonal frequency-division multiplexing (OFDM) symbol and an OFDM symbol cluster. The available time domain resource set is determined based on at least one of: a semi-static configuration by an upper node of the CN 300 and a system pre-definition. The frequency domain resource indication may indicate, based on an available frequency domain resource set, one or more consecutive or non-continuous frequency domain resource units that include at least one of the following: a carrier, a sub-carrier, a bandwidth part, a resource block (RB), a resource block group (RBG), a physical resource block (PRB), and a common resource block (CRB). The available frequency domain resource set is determined based on at least one of: a semi-static configuration by an upper node of the CN 300 and a system pre-definition. The space domain resource indication may indicate, based on an available space domain resource set, one or more consecutive or non-continuous space domain resource units that include at least one of the following: a beam direction, a quasi-co-location (QCL) reference signal set of a downlink reference signal, and a second reference signal of an uplink reference signal with respect to spatial domain transmission filter. In one example, the spatial domain transmission filter of the uplink reference signal may be obtained based on the spatial domain transmission filter of the second reference signal, and/or be the same as the spatial domain transmission filter of the second reference signal. The available space domain resource set is determined based on at least one of: a semi-static configuration by an upper node of the CN 300 and a system pre-definition.

The indication message determiner 322 in this example may determine a message to carry the indication information. The message may be based on a message from the CN 300 to the PN during a random access process for the establishment of the first link, an uplink traffic channel, an uplink control channel, and/or an uplink reference signal. For example, the indication information may be transmitted through message 1 or message 3 during the random access process between the CN 300 and the PN. The message may comprise a preamble sequence. The indication message determiner 322 may inform the indication information generator 321 about the determined message for carrying the indication information.

In one embodiment, the indication information selector 320 in this example may select a preamble sequence from available preamble sequences that are determined based on at least one of: a semi-static configuration by an upper node of the CN 300 and a system pre-definition. The available preamble sequences are grouped into a plurality of preamble sets each of which corresponds to a respective one of different indication ranges of the indication information, based on at least one of: a semi-static configuration by an upper node of the CN 300 and a system pre-definition. The indication information selector 320 may send the selected preamble sequence to the indication information generator 321 for generating the indication information. The indication information is transmitted by the preamble sequence that corresponds to an indication range of the indication information.

In one embodiment, the indication information selector 320 in this example may select a preamble format from available preamble formats that are determined based on at least one of: a semi-static configuration by an upper node of the CN 300 and a system pre-definition. The available preamble formats are grouped into a plurality of preamble format sets each of which corresponds to a respective one of different indication ranges of the indication information, based on at least one of: a semi-static configuration by an upper node of the CN 300 and a system pre-definition. The indication information selector 320 may send the selected preamble format to the indication information generator 321 for generating the indication information. The indication information is transmitted by a preamble sequence having the preamble format that corresponds to an indication range of the indication information. The preamble format is selected based on at least one of: the indication information; at least one characteristic of the PN; at least one characteristic of the first link; and a capability of the CN 300.

In one embodiment, the indication information selector 320 in this example may select a preamble transmission resource from available preamble transmission resources that are determined based on at least one of: a semi-static configuration by an upper node of the CN 300 and a system pre-definition. The preamble transmission resource includes at least one of: a time domain resource, a frequency domain resource, and a space domain resource. The available preamble transmission resources are grouped into a plurality of preamble transmission resource sets each of which corresponds to a respective one of different indication ranges of the indication information, based on at least one of: a semi-static configuration by an upper node of the CN 300 and a system pre-definition. The indication information selector 320 may send the selected preamble transmission resource to the indication information generator 321 for generating the indication information. The indication information is transmitted by a preamble sequence under the preamble transmission resource that corresponds to an indication range of the indication information.

In one embodiment, the indication information selector 320 in this example may select a preamble transmission opportunity from available preamble transmission opportunities in an available preamble transmission resource set that is determined based on at least one of: a semi-static configuration by an upper node of the CN 300 and a system pre-definition. The preamble transmission resource set includes at least one of: a time domain resource, a frequency domain resource, and a space domain resource. The available preamble transmission opportunities are grouped into a plurality of preamble transmission opportunity sets each of which corresponds to a respective one of different indication ranges of the indication information, based on at least one of: a semi-static configuration by an upper node of the CN 300 and a system pre-definition. The indication information selector 320 may send the selected preamble transmission opportunity to the indication information generator 321 for generating the indication information. The indication information is transmitted by a preamble sequence at the preamble transmission opportunity that corresponds to an indication range of the indication information.

The feedback information analyzer 323 in this example may receive, via the receiver 314, and analyze feedback information from the PN, during the establishment of the first link. The feedback information may comprise information about at least one of: a failure of the establishment of the first link; a reason for the failure; and at least one transmission resource configuration that is desired by the PN to be used on the first link. The at least one transmission resource configuration may be indicated based on at least one of: a multiplexing mode indication; a time domain resource indication; a frequency domain resource indication; a space domain resource indication; a hop count indication; and a node type indication. The feedback information analyzer 323 may send the feedback information to the indication transmission controller 324 for controlling indication information transmission or re-transmission, and/or to the transmission resource determiner 325 for determining transmission resource to be used on the first link, i.e. the new link between the CN 300 and the PN.

The indication transmission controller 324 in this example may control indication information transmission or re-transmission based on the feedback information. In one example, in response to a failure of the establishment of the new link, the indication transmission controller 324 controls the indication information generator 321 to re-transmit the indication information to the PN after a delay of a time period. In another example, in response to a failure of the establishment of the new link, the indication transmission controller 324 controls the indication information generator 321 to stop transmission of the indication information to the PN. In yet another example, in response to a failure of the establishment of the new link, the indication transmission controller 324 controls the indication information generator 321 to transmit the indication information to a different PN, during or in response to an establishment of a third link between the CN 300 and the different PN, for determining at least one transmission resource configuration to be used on the third link between the CN 300 and the different PN. In one embodiment, the time period may be determined based on at least one of: a semi-static configuration by an upper node of the CN 300 and a system pre-definition. The different PN may be at least one of: a core network, a base station, and a relay node. The time period may be modified according to a modification step based on at least one of: a quantity of times for which the CN 300 has transmitted the indication information to the PN, and a value range of the at least one transmission resource configuration in the feedback information. The modification step may be determined based on at least one of: a semi-static configuration by an upper node of the CN 300 and a system pre-definition.

The transmission resource determiner 325 in this example determines at least one transmission resource configuration to be used on the first link based on the feedback information. In one example, in response to feedback information indicating a success of the establishment of the new link, the transmission resource determiner 325 determines at least one transmission resource configuration to be used on the first link based on the feedback information received by the feedback information analyzer 323 and the indication information generated by the indication information generator 321.

The power module 308 can include a power source such as one or more batteries, and a power regulator, to provide regulated power to each of the above-described modules in FIG. 3. In some embodiments, if the CN 300 is coupled to a dedicated external power source (e.g., a wall electrical outlet), the power module 308 can include a transformer and a power regulator.

The various modules discussed above are coupled together by a bus system 330. The bus system 330 can include a data bus and, for example, a power bus, a control signal bus, and/or a status signal bus in addition to the data bus. It is understood that the modules of the CN 300 can be operatively coupled to one another using any suitable techniques and mediums.

Although a number of separate modules or components are illustrated in FIG. 3, persons of ordinary skill in the art will understand that one or more of the modules can be combined or commonly implemented. For example, the processor 304 can implement not only the functionality described above with respect to the processor 304, but also implement the functionality described above with respect to the indication information generator 321. Conversely, each of the modules illustrated in FIG. 3 can be implemented using a plurality of separate components or elements.

Figure 4:
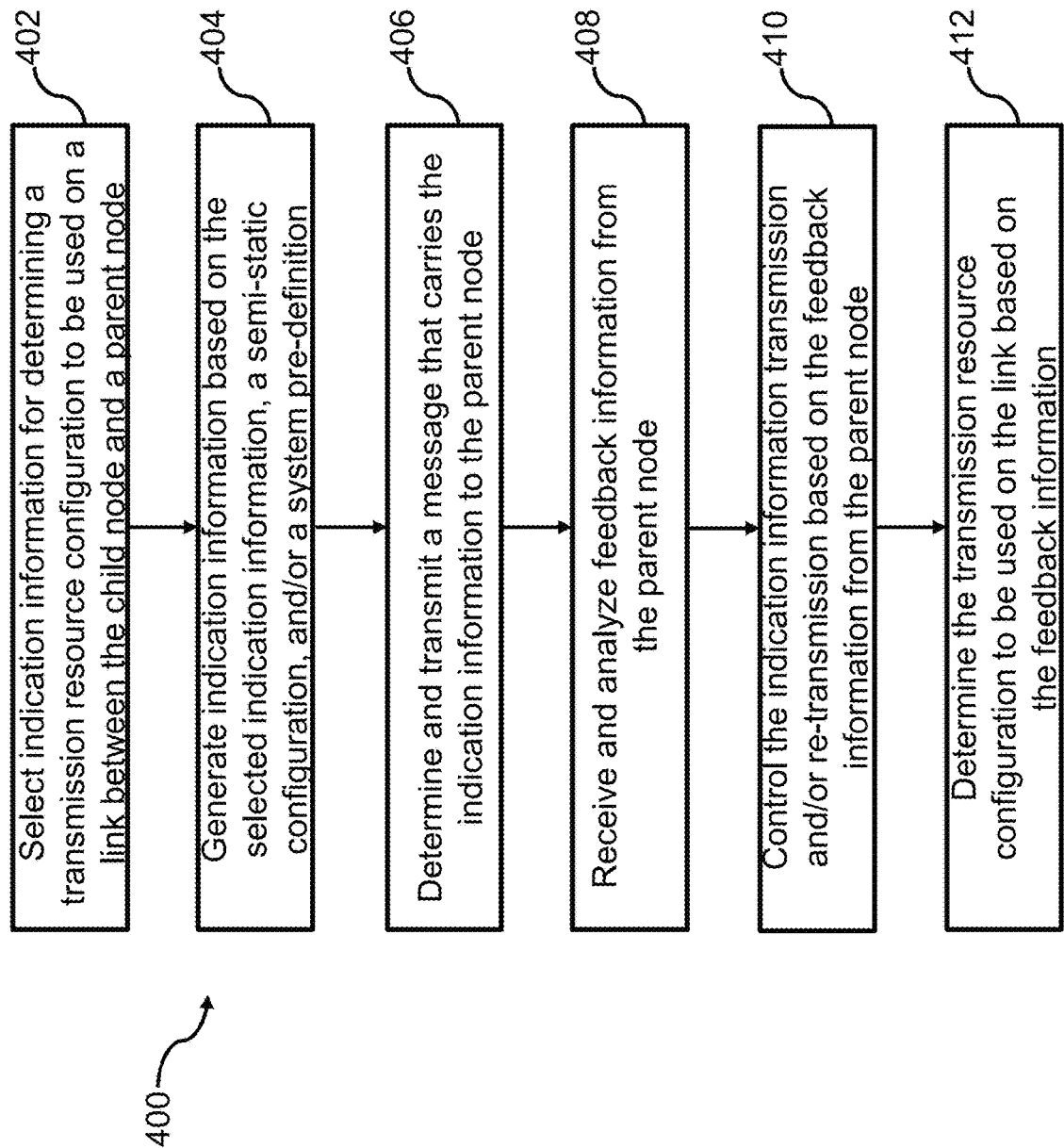
FIG. 4 illustrates a flow chart for a method performed by a CN for transmitting indication information for determining a transmission resource configuration in a wireless communication, in accordance with some embodiments of the present disclosure.

FIG. 4 illustrates a flow chart for a method 400 performed by a CN, e.g. the CN 300 in FIG. 3, for transmitting indication information for determining a transmission resource configuration in a wireless communication, in accordance with some embodiments of the present disclosure. At operation 402, the CN selects indication information for determining a transmission resource configuration to be used on a link between the CN and a parent node. At operation 404, the CN generates indication information based on the selected indication information, a semi-static configuration, and/or a system pre-definition. At operation 406, the CN may determine and transmit a message that carries the indication information to the parent node. At operation 408, the CN may receive and analyze feedback information from the parent node. At operation 410, the CN controls the indication information transmission and/or re-transmission based on the feedback information from the parent node. At operation 412, the CN determines the transmission resource configuration to be used on the link based on the feedback information.

Figure 5:
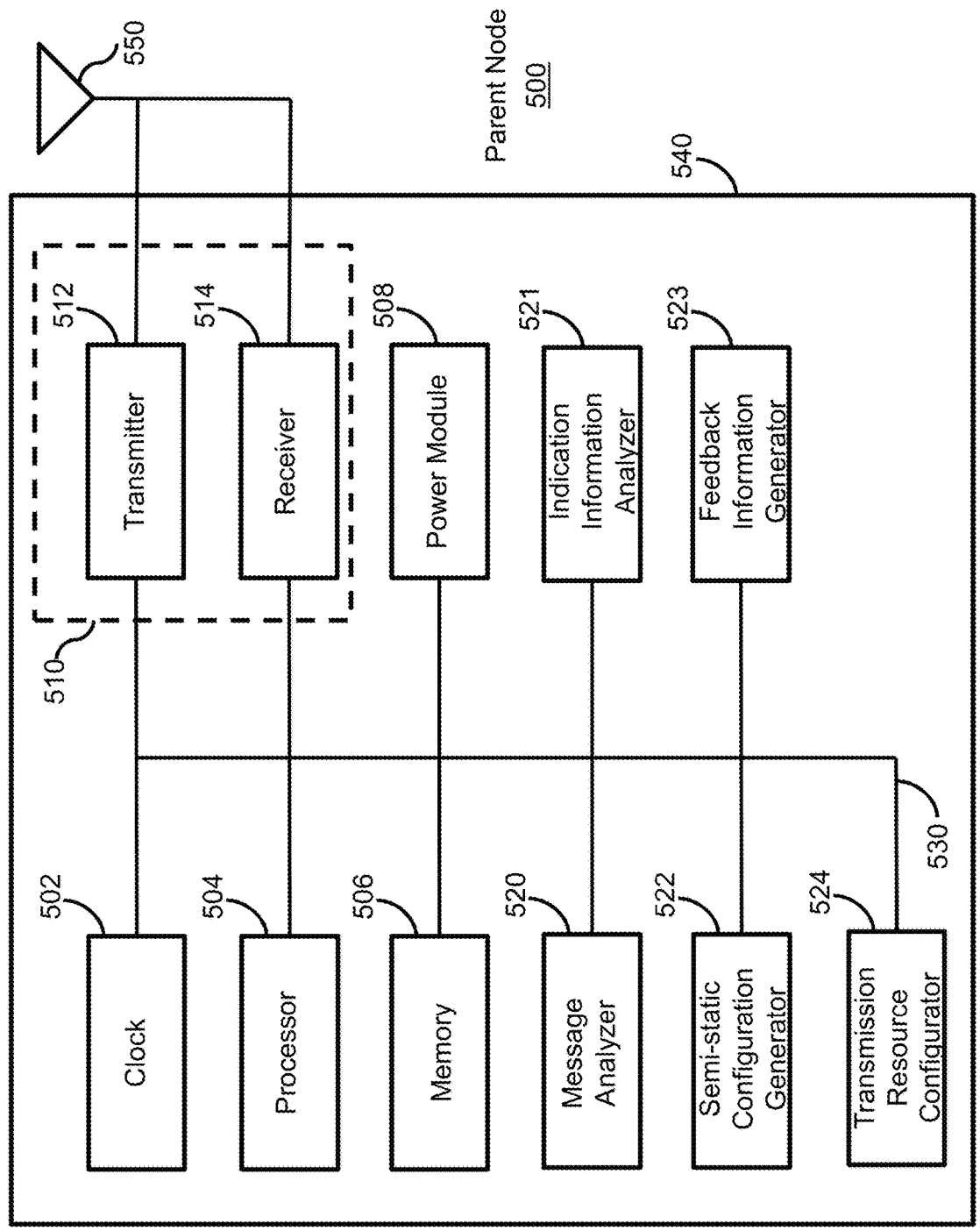
FIG. 5 illustrates a block diagram of a parent node (PN), in accordance with some embodiments of the present disclosure.

FIG. 5 illustrates a block diagram of a parent node (PN) 500, in accordance with some embodiments of the present disclosure. The PN 500 is an example of a device that can be configured to implement the various methods described herein. As shown in FIG. 5, the PN 500 includes a housing 540 containing a system clock 502, a processor 504, a memory 506, a transceiver 510 comprising a transmitter 512 and a receiver 514, a power module 508, a message analyzer 520, an indication information analyzer 521, a semi-static configuration generator 522, a feedback information generator 523, and a transmission resource configurator 524.

In this embodiment, the system clock 502, the processor 504, the memory 506, the transceiver 510 and the power module 508 work similarly to the system clock 302, the processor 304, the memory 306, the transceiver 310 and the power module 308 in the CN 300. An antenna 550 or a multi-antenna array 550 is typically attached to the housing 440 and electrically coupled to the transceiver 510.

In a multi-hop relay system, the PN 500 may be a core network, a base station, or a relay node. A child node (CN) may try to access the PN 500 without resource conflict, by transmitting indication information. In one embodiment, the indication information analyzer 521 may receive, via the receiver 514, and analyze indication information from a CN, during or after an establishment of a first link between the PN 500 and the CN, for determining at least one transmission resource configuration to be used on the first link. The at least one transmission resource configuration to be used on the first link is determined to avoid an interference between the first link and a second link that has been established between the CN and another relay node or a terminal. The indication information may comprise information about at least one of the following: the PN 500, the CN, and the first link.

In one embodiment, the indication information comprises information about at least one of the following: a multiplexing mode indication; a time domain resource indication; a frequency domain resource indication; a space domain resource indication; a hop count indication; and a node type indication. The multiplexing mode indication may indicate at least one of: at least one multiplexing mode supported by the first link, at least one multiplexing mode not supported by the first link, at least one multiplexing mode desired by the CN, and at least one multiplexing mode not desired by the CN. The time domain resource indication indicates at least one of: at least one time domain resource configuration supported by the first link, at least one time domain resource configuration not supported by the first link, at least one time domain resource configuration desired by the CN, and at least one time domain resource configuration not desired by the CN. The frequency domain resource indication indicates at least one of: at least one frequency domain resource configuration supported by the first link, at least one frequency domain resource configuration not supported by the first link, at least one frequency domain resource configuration desired by the CN, and at least one frequency domain resource configuration not desired by the CN. The space domain resource indication indicates at least one of: at least one space domain resource configuration supported by the first link, at least one space domain resource configuration not supported by the first link, at least one space domain resource configuration desired by the CN, and at least one space domain resource configuration not desired by the CN. The hop count indication indicates at least one of: hop count information of the PN 500, and hop count information of the CN; and hop count information of the first link. The node type indication indicates at least one of: a node type of the PN 500, and a node type of the CN.

The multiplexing mode indication may indicate, based on an available multiplexing mode set, at least one of or a combination of at least two of the following multiplexing modes: time division multiplexing (TDM), frequency division multiplexing (FDM), and space division multiplexing (SDM). The available multiplexing mode set is determined based on at least one of: a semi-static configuration by an upper node of the CN and a pre-definition of the system. The upper node of the CN may be any node at an upper position in the same branch of the CN. For example, the upper node may be an old PN or the new PN 500. The time domain resource indication may indicate, based on an available time domain resource set, one or more consecutive or non-continuous time domain resource units that include at least one of the following: a radio frame, a half-frame, a sub-frame, a time slot, a mini-slot, an orthogonal frequency-division multiplexing (OFDM) symbol and an OFDM symbol cluster. The available time domain resource set is determined based on at least one of: a semi-static configuration by an upper node of the CN and a system pre-definition. The frequency domain resource indication may indicate, based on an available frequency domain resource set, one or more consecutive or non-continuous frequency domain resource units that include at least one of the following: a carrier, a sub-carrier, a bandwidth part, a resource block (RB), a resource block group (RBG), a physical resource block (PRB), and a common resource block (CRB). The available frequency domain resource set is determined based on at least one of: a semi-static configuration by an upper node of the CN and a system pre-definition. The space domain resource indication may indicate, based on an available space domain resource set, one or more consecutive or non-continuous space domain resource units that include at least one of the following: a beam direction, a quasi-co-location (QCL) reference signal set of a downlink reference signal, and a second reference signal of an uplink reference signal with respect to spatial domain transmission filter. In one example, the spatial domain transmission filter of the uplink reference signal may be obtained based on the spatial domain transmission filter of the second reference signal, and/or be the same as the spatial domain transmission filter of the second reference signal. The available space domain resource set is determined based on at least one of: a semi-static configuration by an upper node of the CN and a system pre-definition.

The semi-static configuration generator 522 in this example may generate and transmit, via the transmitter 512, a semi-static configuration to the CN. The message analyzer 520 in this example may receive, via the receiver 514, and analyze a message carrying the indication information from the CN. The message may be based on a message from the CN to the PN 500 during a random access process for the establishment of the first link, an uplink traffic channel, an uplink control channel, and/or an uplink reference signal. For example, the indication information may be transmitted through message 1 or message 3 during the random access process between the CN and the PN 500. In one embodiment, the message analyzer 520 may extract the indication information from the received message and send it to the indication information analyzer 521 for analysis.

In one embodiment, the message may comprise a preamble sequence. The preamble sequence is selected from available preamble sequences that are determined based on at least one of: a semi-static configuration by an upper node of the CN and a system pre-definition. The available preamble sequences are grouped into a plurality of preamble sets each of which corresponds to a respective one of different indication ranges of the indication information, based on at least one of: a semi-static configuration by an upper node of the CN and a system pre-definition. The indication information is transmitted by the preamble sequence that corresponds to an indication range of the indication information.

In one embodiment, a preamble format is selected from available preamble formats that are determined based on at least one of: a semi-static configuration by an upper node of the CN and a system pre-definition. The available preamble formats are grouped into a plurality of preamble format sets each of which corresponds to a respective one of different indication ranges of the indication information, based on at least one of: a semi-static configuration by an upper node of the CN and a system pre-definition. The indication information is transmitted by a preamble sequence having the preamble format that corresponds to an indication range of the indication information. The preamble format is selected based on at least one of: the indication information; at least one characteristic of the PN 500; at least one characteristic of the first link; and a capability of the CN.

In one embodiment, a preamble transmission resource is selected from available preamble transmission resources that are determined based on at least one of: a semi-static configuration by an upper node of the CN and a system pre-definition. The preamble transmission resource includes at least one of: a time domain resource, a frequency domain resource, and a space domain resource. The available preamble transmission resources are grouped into a plurality of preamble transmission resource sets each of which corresponds to a respective one of different indication ranges of the indication information, based on at least one of: a semi-static configuration by an upper node of the CN and a system pre-definition. The indication information is transmitted by a preamble sequence under the preamble transmission resource that corresponds to an indication range of the indication information.

In one embodiment, a preamble transmission opportunity is selected from available preamble transmission opportunities in an available preamble transmission resource set that is determined based on at least one of: a semi-static configuration by an upper node of the CN and a system pre-definition. The preamble transmission resource set includes at least one of: a time domain resource, a frequency domain resource, and a space domain resource. The available preamble transmission opportunities are grouped into a plurality of preamble transmission opportunity sets each of which corresponds to a respective one of different indication ranges of the indication information, based on at least one of: a semi-static configuration by an upper node of the CN and a system pre-definition. The indication information is transmitted by a preamble sequence at the preamble transmission opportunity that corresponds to an indication range of the indication information.

The feedback information generator 523 in this example may generate and transmit, via the transmitter 512, feedback information to the CN during the establishment of the first link. The feedback information comprises information about at least one of: a failure of the establishment of the first link; a reason for the failure; and at least one transmission resource configuration that is desired by the PN 500 to be used on the first link.

The transmission resource configurator 524 in this example may configure the at least one transmission resource configuration that can be accepted by the PN 500 to be used on the first link. The at least one transmission resource configuration may be indicated based on at least one of: a multiplexing mode indication; a time domain resource indication; a frequency domain resource indication; a space domain resource indication; a hop count indication; and a node type indication. The transmission resource configurator 524 may send the configured transmission resource configuration to the feedback information generator 523 for generating the feedback information.

The indication information analyzer 521 may be further configured for receiving, via the receiver 514, and analyzing the indication information that is transmitted again from the CN after a delay of a time period. In one example, the indication information analyzer 521 may stop receiving the indication information from the CN. In one embodiment, the time period may be determined based on at least one of: a semi-static configuration by an upper node of the CN and a system pre-definition. The different PN may be at least one of: a core network, a base station, and a relay node. The time period may be modified according to a modification step based on at least one of: a quantity of times for which the PN 500 has received the indication information from the CN, and a value range of the at least one transmission resource configuration in the feedback information. The modification step may be determined based on at least one of: a semi-static configuration by an upper node of the CN and a system pre-definition.

The various modules discussed above are coupled together by a bus system 530. The bus system 530 can include a data bus and, for example, a power bus, a control signal bus, and/or a status signal bus in addition to the data bus. It is understood that the modules of the PN 500 can be operatively coupled to one another using any suitable techniques and mediums.

Although a number of separate modules or components are illustrated in FIG. 5, persons of ordinary skill in the art will understand that one or more of the modules can be combined or commonly implemented. For example, the processor 504 can implement not only the functionality described above with respect to the processor 504, but also implement the functionality described above with respect to the indication information analyzer 521. Conversely, each of the modules illustrated in FIG. 5 can be implemented using a plurality of separate components or elements.

Figure 6:
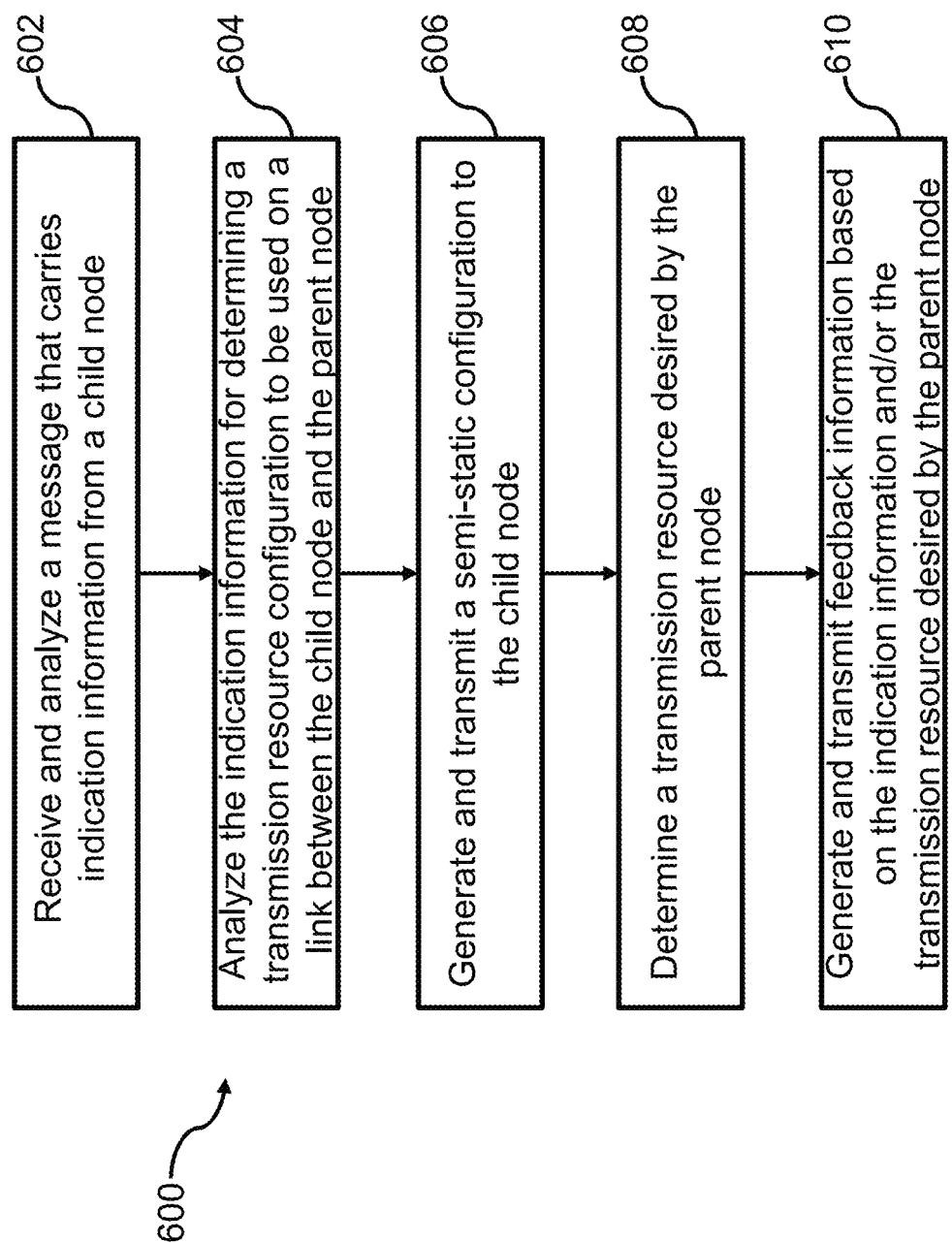
FIG. 6 illustrates a flow chart for a method performed by a PN for receiving indication information for determining a transmission resource configuration in a wireless communication, in accordance with some embodiments of the present disclosure.

FIG. 6 illustrates a flow chart for a method 600 performed by a PN, e.g. the PN 500 in FIG. 5, for receiving indication information for determining a transmission resource configuration in a wireless communication, in accordance with some embodiments of the present disclosure. At operation 602, the PN receives and analyzes a message that carries indication information from a child node (CN). At operation 604, the PN analyzes the indication information for determining a transmission resource configuration to be used on a link between the CN and the PN. At operation 606, the PN generates and transmits a semi-static configuration to the CN. At operation 608, the PN determines a transmission resource desired by the PN. At operation 610, the PN generates and transmits feedback information based on the indication information and/or the transmission resource desired by the PN.

Different embodiments of the present disclosure will now be described in detail hereinafter. It is noted that the features of the embodiments and examples in the present disclosure may be combined with each other in any manner without conflict.

In a first embodiment, the indication information may be sent via Msg1 in the random access channel (RACH) process. In this embodiment, referring to FIG. 2, the relay node RN6 216 needs to access the parent node RN2 212. The relay node RN6 was previously connected to the parent node RN5, and then the relay node RN6 needs to access the new parent node RN2 because of handover or link failure or other reasons. Before the RN6 accesses the RN2, the RN6 itself is also the parent node of the RN7, and the UE6 is connected under the RN6. That is, the RN6 itself may be the parent node of other relay nodes, or serve some terminals. In this embodiment, the parent node of the RN6 is also an RN node. But in other embodiments, the parent node of the RN6 may be either an RN node or a base station. The link between RN2 and RN6 is called Link RN2_RN6; the link between RN6 and UE6 is called Link RN6_UE6; the link between RN6 and RN7 is called Link RN6_RN7; and the link between RN7 and UE7 is called Link. RN7_UE7.

In the process of initiating random access to the RN2, in the Msg1 sent by the RN6 to the RN2, the RN6 indicates to the RN2 one or more of the following information: expected multiplexing mode indication; unexpected multiplexing mode indication; expected time domain resource indication; unexpected time domain resource indication; expected frequency domain resource indication; unexpected frequency domain resource indication; expected space domain resource indication; unexpected space domain resource indication; hop count indication; node type indication.

The expected multiplexing mode indication indicates the resource multiplexing mode the RN6 expects the Link RN2_RN6 and the other one or more links to adopt, for example, one or a combination of TDM, FDM, and SDM is expected. The unexpected multiplexing mode indication indicates the resource multiplexing mode the RN 6 does not expect the Link RN2 RN6 and the other one or more links to adopt, for example, one or a combination of TDM, FDM, and SDM is not expected.

The expected time domain resource indication indicates the time domain resource range the RN6 expects the Link RN2_RN6 to adopt, and may be one or more consecutive or multiple non-contiguous time domain resource units. The expected time domain resource unit may be radio frame, half frame, sub-frame, slot, mini-slot, OFDM symbol cluster, or OFDM symbol. The unexpected time domain resource indication indicates the time domain resource range the RN6 does not expect the Link RN2_RN6 to adopt, and may be one or more consecutive or multiple non-contiguous time domain resource units. The unexpected time domain resource unit may be radio frame, half frame, sub-frame, slot, mini-slot, OFDM symbol cluster, or OFDM symbol.

The expected frequency domain resource indication indicates the frequency domain resource range the RN6 expects the Link RN2_RN6 to adopt, and may be one or more consecutive or multiple non-contiguous frequency domain resource units. The expected frequency domain resource unit may be a carrier, a subcarrier, a bandwidth part, a resource block (RB), a resource block group (RBG), a physical resource block (PRB), and a common resource block (CRB). The unexpected frequency domain resource indication indicates the frequency domain resource range the RN6 does not expect the Link RN2_RN6 to adopt, and may be one or more consecutive or multiple non-contiguous frequency domain resource units. The unexpected frequency domain resource unit may be a carrier, a subcarrier, a bandwidth part, a resource block (RB), a resource block group (RBG), a physical resource block (PRB), and a common resource block (CRB).

The expected space domain resource indication indicates the beam direction range the RN6 expects the Link RN2 RN6 to adopt, and may be one or more beam direction index numbers or weight index numbers or QCL reference signal sets or a second reference signal set of an uplink reference signal with respect to spatial domain transmission filter. The unexpected space domain resource indication indicates the beam direction range the RN6 does not expect the Link RN2_RN6 to adopt, and may be one or more beam direction index numbers or weight index numbers or QCL reference signal sets or a second reference signal set of an uplink reference signal with respect to spatial domain transmission filter.

The hop count indication indicates the node hop count information of the RN6, or the link hop count information of the Link RN2 RN6. It may be a 1-bit parity indication, for example, "0" indicates an odd hop count, and "1" indicates an even hop count. It can also be a specific numerical indication indicating that RN6 is the n-th hop when connecting to the old or new parent node, where n is an integer. Different hop count indication information may be associated with different multiplexing modes and/or time domain resources and/or frequency domain resources and/or space domain resources. The association between the hop count information and other information may be predefined by the system or semi-statically configured by the parent node.

The node type indication indicates the node type of RN6, such that the RN2 node knows what type of node is initiating the random access. Based on a pre-definition of the system or a semi-static configuration of the parent node, the node type of the RN6 may be at least one of the following: a relay node, a terminal, an m-th hop relay node, an odd hop relay node, an even hop relay node, and a node connecting to a child node, and a node not connecting to any child node, etc.

The RN 6 indicates to the RN 2 one or more pieces of information mentioned above, where the indication may be an explicit indication or an implicit indication. Specifically, the explicit indication may be: adding a "multiplex mode indication" field and/or a "resource indication" field and/or a "hop count indication" field and/or a "node type indication" field in the Msg1. For the "multiplexing mode indication" field, the system pre-defines or the parent node semi-statically configures candidate multiplex modes for the RN6. The RN6 indicates one or more of the candidate multiplexing modes in the "multiplex mode indication" field. For the "resource indication" field, the system pre-defines or the parent node semi-statically configures the candidate resources for the RN6, and the RN6 indicates one or more of the candidate resources in the "resource indication" field. For the "hop count indication" field, the system pre-defines or the parent node semi-statically configures the supported hop count range for the RN6, and the RN 6 indicates one or more of the supported hop count ranges in the "hop count indication" field. For the "node type indication" field, the system pre-defines or the parent node semi-statically configures the supported node types for the RN6, and the RN 6 indicates one or more of the supported node types in the "node type indication" field.

The implicit indication may be specifically one or more of the following. In a first implicit indication, different preamble sequences are sent in Msg1, to correspond to different values of the above mentioned indication information. In one example, the preamble sequence available to the relay node RN6 is {preamble set 1}, which may be pre-defined by the system or semi-statically configured by the parent node to the relay node.

In some embodiments, the system pre-defines or the parent node semi-statically configures the corresponding relationship between the preamble sequence and the value range of the above-mentioned information. For example: for the multiplexing mode, {preamble set a1} corresponds to FDM multiplexing mode, {preamble set a2} corresponds to TDM multiplexing mode, {preamble set a3} corresponds to SDM multiplexing mode, {preamble set a4} corresponds to TDM+FDM multiplexing modes, etc.; for time domain resources, {preamble set b1} corresponds to time domain resource 1, {preamble set b2} corresponds to time domain resource 2, {preamble set b3} corresponds to time domain resource 3, etc.; for frequency domain resources, {preamble set c1} corresponds to frequency domain resource 1, {preamble set c2} corresponds to frequency domain resource 2, {preamble set c3} corresponds to frequency domain resource 3, etc.; for space domain resources, {preamble set d1} corresponds to space domain resource 1, {preamble set d2} corresponds to space domain resource 2, {preamble set d3} corresponds to space domain resource 3, etc.

According to the information indication that the RN6 wants to send to the RN2, the RN6 will take an intersection of the {preamble set 1} and the {preamble set xy}, wherein x represents different indication information types, and y represents different value ranges supported under a certain indication information type. The RN6 then selects a preamble sequence in the intersection, and send it to RN2 in Msg1.

In one embodiment, the corresponding relationship between the preamble sequence and the value range of the above-mentioned information is based on a partition of available preamble sequences at the first place. As such, no intersection operation is needed after determining the {preamble set xy}.

In a second implicit indication, Msg1 is transmitted in different preamble formats, which correspond to different value ranges of the above information. The candidate preamble format available to the relay node RN6 is {preamble format set 1}, which may be pre-defined by the system or semi-statically configured by the parent node to the relay node.

The system pre-defines or the parent node semi-statically configures the corresponding relationship between the preamble format and the value range of the above-mentioned information. For example: for the multiplexing mode, {preamble format set a1} corresponds to FDM multiplexing mode, {preamble format set a2} corresponds to TDM multiplexing mode, {preamble format set a3} corresponds to SDM multiplexing mode, {preamble format set a4} corresponding to TDM+FDM multiplexing modes, etc.; for the time domain resource, {preamble format set b1} corresponds to time domain resource 1, {preamble format set b2} corresponds to time domain resource 2, {preamble format set b3} corresponds to time domain resource 3, etc.; for the frequency domain resource, {preamble format set c1} corresponds to frequency domain resource 1, {preamble format set c2} corresponds to frequency domain resource 2, {preamble format set c3} corresponds to frequency domain resource 3, etc.; for space domain resources, {preamble format set d1} corresponds to space domain resource 1, {preamble format set d2} corresponds to space domain resource 2, {preamble format set d3} corresponds to space domain resource 3, etc.

According to the information indication that the RN6 wants to send to the RN2, the RN6 will take an intersection of the {preamble format set 1} and the {preamble format set xy}, where x represents different indication information types, and y represents different value ranges supported under a given indication information type. The RN6 selects a preamble format in the intersection, and sends Msg1 to RN2 using the selected preamble format.

In one embodiment, the corresponding relationship between the preamble format and the value range of the above-mentioned information is based on a partition of available preamble formats at the first place. As such, no intersection operation is needed after determining the {preamble format set xy}.

In a third implicit indication, Msg1 is transmitted with different time domain resources, which correspond to different value ranges of the above indication information. The parent node may configure one or more candidate time domain resource sets for the RN6 to transmit the preamble. If the parent node configures a plurality of candidate time domain resource sets for the RN6 to transmit the preamble, different candidate time domain resource sets may correspond to different value ranges of the foregoing indication information. The corresponding relationship between the candidate time domain resource set and the above information value range may be predefined by the system or semi-statically configured by the parent node.

For example, the parent node configures two candidate time domain resource sets for the RN6 to transmit the preamble. The two sets are respectively ConfigIndex1 and ConfigIndex2. If the RN6 sends the preamble on the ConfigIndex1, the value of the indication information is in the range 1; if the RN6 sends the preamble on the ConfigIndex2, then the value of the indication information is in the range 2. If the parent node configures a set of candidate time domain resources for the RN6 to transmit the preamble, different transmission opportunities or transmission times in the set may correspond to different value ranges of the above indication information. For example, a preamble is sent on different sub-frames or slots or transmission opportunities in the time domain resource set, corresponding to different value ranges of the above indication information.

In a fourth implicit indication, Msg1 is transmitted with different frequency domain resources, which correspond to different value ranges of the above indication information. The parent node may configure one or more candidate frequency domain resource sets for the RN6 to transmit the preamble. If the parent node configures a plurality of candidate frequency domain resource sets for the RN6 to transmit the preamble, different candidate frequency domain resource sets may correspond to different value ranges of the foregoing indication information. The corresponding relationship between the candidate frequency domain resource set and the above information value range may be predefined by the system or semi-statically configured by the parent node.

For example, the parent node configures two candidate time domain resource sets for the RN6 to transmit the preamble. The two sets are respectively {Msg1_FrequencyStart1, Msg1_FDM1} and {Msg1_FrequencyStart2, Msg1_FDM2}. If the RN6 sends the preamble on the {Msg1_FrequencyStart1, Msg1 FDM1}, the value of the indication information is in the range 1; if the RN6 sends the preamble on the {Msg1_FrequencyStart2, Msg1_FDM2}, then the value of the indication information is in the range 2.

If the parent node configures a set of candidate frequency domain resources for the RN6 to transmit the preamble, different transmission opportunities or starting transmission RB index numbers may correspond to different value ranges of the above indication information.

In a second embodiment, the indication information may be sent via Msg3 in the random access channel (RACH) process. In this embodiment, referring to FIG. 2, the relay node RN6 216 needs to access the parent node RN2 212. The relay node RN6 was previously connected to the parent node RN5, and then the relay node RN6 needs to access the new parent node RN2 because of handover or link failure or other reasons. Before the RN6 accesses the RN2, the RN6 itself is also the parent node of the RN7, and the UE6 is connected under the RN6. That is, the RN6 itself may be the parent node of other relay nodes, or serve some terminals. In this embodiment, the parent node of the RN6 is also an RN node. But in other embodiments, the parent node of the RN6 may be either an RN node or a base station. The link between RN2 and RN6 is called Link RN2_RN6; the link between RN6 and UE6 is called Link RN6_UE6; the link between RN6 and RN7 is called Link RN6_RN7; and the link between RN7 and UE7 is called Link. RN7_UE7.

In the process of initiating random access to RN2, if it is a contention-based random access, in order to resolve the conflict, RN6 needs to send Msg3 to RN2. In Msg3, RN6 can indicate one or more of the following information to RN2: expected multiplexing mode indication; unexpected multiplexing mode indication; expected time domain resource indication; unexpected time domain resource indication; expected frequency domain resource indication; unexpected frequency domain resource indication; expected space domain resource indication; unexpected space domain resource indication; hop count indication; node type indication.

The expected multiplexing mode indication indicates the resource multiplexing mode the RN6 expects the Link RN2_RN6 and the other one or more links to adopt, for example, one or a combination of TDM, FDM, and SDM is expected. The unexpected multiplexing mode indication indicates the resource multiplexing mode the RN 6 does not expect the Link RN2 RN6 and the other one or more links to adopt, for example, one or a combination of TDM, FDM, and SDM is not expected.

The expected time domain resource indication indicates the time domain resource range the RN6 expects the Link RN2_RN6 to adopt, and may be one or more consecutive or multiple non-contiguous time domain resource units. The expected time domain resource unit may be radio frame, half frame, sub-frame, slot, mini-slot, OFDM symbol cluster, or OFDM symbol. The unexpected time domain resource indication indicates the time domain resource range the RN6 does not expect the Link RN2_RN6 to adopt, and may be one or more consecutive or multiple non-contiguous time domain resource units. The unexpected time domain resource unit may be radio frame, half frame, sub-frame, slot, mini-slot, OFDM symbol cluster, or OFDM symbol.

The expected frequency domain resource indication indicates the frequency domain resource range the RN6 expects the Link RN2_RN6 to adopt, and may be one or more consecutive or multiple non-contiguous frequency domain resource units. The expected frequency domain resource unit may be a carrier, a subcarrier, a bandwidth part, a resource block (RB), a resource block group (RBG), a physical resource block (PRB), and a common resource block (CRB). The unexpected frequency domain resource indication indicates the frequency domain resource range the RN6 does not expect the Link RN2_RN6 to adopt, and may be one or more consecutive or multiple non-contiguous frequency domain resource units. The unexpected frequency domain resource unit may be a carrier, a subcarrier, a bandwidth part, a resource block (RB), a resource block group (RBG), a physical resource block (PRB), and a common resource block (CRB).

The expected space domain resource indication indicates the beam direction range the RN6 expects the Link RN2 RN6 to adopt, and may be one or more beam direction index numbers or weight index numbers or QCL reference signal sets or a second reference signal set of an uplink reference signal with respect to spatial domain transmission filter. The unexpected space domain resource indication indicates the beam direction range the RN6 does not expect the Link RN2_RN6 to adopt, and may be one or more beam direction index numbers or weight index numbers or QCL reference signal sets or a second reference signal set of an uplink reference signal with respect to spatial domain transmission filter.

The hop count indication indicates the node hop count information of the RN6, or the link hop count information of the Link RN2_RN6. It may be a 1-bit parity indication, for example, "0" indicates an odd hop count, and "1" indicates an even hop count. It can also be a specific numerical indication indicating that it is the n-th hop, where n is an integer. Different hop count indication information may be associated with different multiplexing modes and/or time domain resources and/or frequency domain resources and/or space domain resources. The association between the hop count information and other information may be predefined by the system or semi-statically configured by the parent node.

The node type indication indicates the node type of RN6, such that the RN2 node knows what type of node is initiating the random access. Based on a pre-definition of the system or a semi-static configuration of the parent node, the node type of the RN6 may be at least one of the following: a relay node, a terminal, an m-th hop relay node, an odd hop relay node, an even hop relay node, and a node connecting to a child node, and a node not connecting to any child node, etc.

The RN 6 indicates to the RN 2 one or more pieces of information mentioned above, e.g. by: adding a "multiplex mode indication" field and/or a "resource indication" field and/or a "hop count indication" field and/or a "node type indication" field in the Msg3. For the "multiplexing mode indication" field, the system pre-defines or the parent node semi-statically configures candidate multiplex modes for the RN6. The RN6 indicates one or more of the candidate multiplexing modes in the "multiplex mode indication" field. For the "resource indication" field, the system pre-defines or the parent node semi-statically configures the candidate resources for the RN6, and the RN6 indicates one or more of the candidate resources in the "resource indication" field. For the "hop count indication" field, the system pre-defines or the parent node semi-statically configures the supported hop count range for the RN6, and the RN 6 indicates one or more of the supported hop count ranges in the "hop count indication" field. For the "node type indication" field, the system pre-defines or the parent node semi-statically configures the supported node types for the RN6, and the RN 6 indicates one or more of the supported node types in the "node type indication" field.

In a third embodiment, indication information is indicated in physical uplink shared channel (PUSCH) or physical uplink control channel (PUCCH) or sounding reference signal (SRS) after the RACH process is completed. In this embodiment, referring to FIG. 2, the relay node RN6 216 needs to access the parent node RN2 212. The relay node RN6 was previously connected to the parent node RN5, and then the relay node RN6 needs to access the new parent node RN2 because of handover or link failure or other reasons. Before the RN6 accesses the RN2, the RN6 itself is also the parent node of the RN7, and the UE6 is connected under the RN6. That is, the RN6 itself may be the parent node of other relay nodes, or serve some terminals. In this embodiment, the parent node of the RN6 is also an RN node. But in other embodiments, the parent node of the RN6 may be either an RN node or a base station. The link between RN2 and RN6 is called Link RN2_RN6; the link between RN6 and UE6 is called Link RN6_UE6; the link between RN6 and RN7 is called Link RN6_RN7; and the link between RN7 and UE7 is called Link. RN7_UE7.

The RN6 initiates a random access to the RN2. After the random access is completed, if the RN6 successfully accesses the RN2, then RN6 sends one or more of the following indication information to the RN2: expected multiplexing mode indication; unexpected multiplexing mode indication; expected time domain resource indication; unexpected time domain resource indication; expected frequency domain resource indication; unexpected frequency domain resource indication; expected space domain resource indication; unexpected space domain resource indication; hop count indication; node type indication. The RN6 may send the indication information in the PUSCH or PUCCH. Alternatively, the RN6 may send the indication information through the SRS.

In a fourth embodiment, RN2 may indicate a rejection of the access of RN6. If RN6 explicitly or implicitly indicates one or more kinds of indication information (which inherently includes requests) described in the first embodiment in Msg1 sent to RN2, RN2 may reject RN6's access because one or more of the requests cannot be satisfied. Then RN2 may inform the RN6 about the reason for rejecting the random access, such that the RN6 can re-initiate random access to the RN2 in consideration of a modification of the indication information. In one example, after receiving the reason for rejecting the random access, the RN6 does not initiate random access to the RN2, but initiates a random access to another node. RN2 can inform the RN6 of the reason for rejecting random access by an explicit indication in Msg2 or Msg4 during the random access process. For example, one or more new RAR sub-headers may be introduced. In the new RAR sub-header, RN2 indicates to RN6 at least one of the following information: multiplexing mode indication; time domain resource indication; frequency domain resource indication; space domain resource indication; hop count indication; and note type indication.

If the RN6 detects a new RAR sub-header in the media access control (MAC) protocol data unit (PDU) corresponding to the Msg2 or Msg4, the RN2 learns the multiplexing mode, the time domain resource, the frequency domain resource, the space domain resources, the access node hop counts, and/or the access link hop counts that the RN2 can accept, according to the above information indicated by the sub-header. If the RN6 agrees with the information indicated by the RN2, the RN6 may re-initiate a random access to the RN2, re-transmits the Msg1 that carries the adjusted indication information.

If the RN6 disagrees with the information indicated by the RN2, the RN 6 can perform at least one of the following operations: stopping transmitting Msg1 to RN2, but initiating a random access to other nodes; and waiting for the delay T to re-transmit Msg1 to RN2. The delay T may be pre-defined by the system or semi-statically configured to RN6 by an upper parent node. The delay T can be increased or decreased by a modification step depending on certain factors. The certain factors may include at least one of the following: the number of times the RN6 transmits the Msg1 to the RN2; and the value range of the information indicated by the RN2 to the RN6 in the Msg2 or Msg4. The size of modification step may be a pre-defined by the system or based on a semi-static configuration.

In some embodiments, the RN6 may detect a RAR sub-header in the MAC PDU corresponding to the Msg2 or Msg4, indicating that RN2 agrees the access of the RN6 and the proposed multiplexing mode and/or proposed transmission resource of the RN6. Then the RN6 can establish the new link with the RN2 with the agreed multiplexing mode and/or transmission resource. In other embodiments, the RN2 may first transmit indication information to RN6, e.g. in Msg2 in the random access process. Then, RN6 can send a feedback to RN2 to indicate whether to agree with the proposed multiplexing mode and/or proposed transmission resource to be used on the new link between RN2 and RN6.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device.

A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a first wireless communication node, the method comprising:
    transmitting indication information to a second wireless communication node, in connection with an establishment of a first link between the first wireless communication node and the second wireless communication node, for determining at least one transmission resource configuration to be used on the first link, wherein the indication information comprises information about at least one of the following:
        a multiplexing mode indication, wherein the multiplexing mode indication indicates: at least one multiplexing mode supported by the first link, and at least one multiplexing mode desired by the first wireless communication node; and
        a space domain resource indication, wherein the space domain resource indication indicates: at least one space domain resource configuration supported by the first link, and at least one space domain resource configuration desired by the first wireless communication node;
    wherein the multiplexing mode indication indicates, based on an available multiplexing mode set, at least one of or a combination of at least two of the following multiplexing modes:
        time division multiplexing (TDM),
        frequency division multiplexing (FDM), and
        space division multiplexing (SDM); and
    wherein the available multiplexing mode set is determined based on at least one of: a semi-static configuration by a third wireless communication node and a system pre-definition.

2. The method of claim 1, wherein:
    the indication information further comprises information about at least one of the following:
    the first wireless communication node, the second wireless communication node, and the first link;
    a time domain resource indication, wherein the time domain resource indication indicates: at least one time domain resource configuration supported by the first link, and at least one time domain resource configuration desired by the first wireless communication node;
    a frequency domain resource indication, wherein the frequency domain resource indication indicates: at least one frequency domain resource configuration supported by the first link, and at least one frequency domain resource configuration desired by the first wireless communication node;
    a hop count indication, wherein the hop count indication indicates at least one of: hop count information of the first wireless communication node, and hop count information of the second wireless communication node; and hop count information of the first link; and
    a node type indication, wherein the node type indication indicates at least one of: a node type of the first wireless communication node, and a node type of the second wireless communication node.

3. The method of claim 2, wherein:
    the time domain resource indication indicates, based on an available time domain resource set, one or more consecutive or non-continuous time domain resource units that include at least one of the following: a radio frame, a half-frame, a sub-frame, a time slot, a mini-slot, an orthogonal frequency-division multiplexing (OFDM) symbol and an OFDM symbol cluster; and
    the available time domain resource set is determined based on at least one of: a semi-static configuration by a third wireless communication node and a system pre-definition.

4. The method of claim 2, wherein:
    the frequency domain resource indication indicates, based on an available frequency domain resource set, one or more consecutive or non-continuous frequency domain resource units that include at least one of the following: a carrier, a sub-carrier, a bandwidth part, a resource block (RB), a resource block group (RBG), a physical resource block (PRB), and a common resource block (CRB); and the available frequency domain resource set is determined based on at least one of: a semi-static configuration by a third wireless communication node and a system pre-definition.

5. The method of claim 1, wherein:

the space domain resource indication indicates, based on an available space domain resource set, one or more consecutive or non-continuous space domain resource units that include at least one of the following: a beam direction, a quasi-co-location (QCL) reference signal set of a downlink reference signal, and a second reference signal of an uplink reference signal with respect to spatial domain transmission filter; and the available space domain resource set is determined based on at least one of: a semi-static configuration by a third wireless communication node and a system pre-definition.

6. The method of claim 1, wherein:

the indication information is transmitted through at least one of:
 a message from the first wireless communication node to the second wireless communication node during a random access process for the establishment of the first link,
 an uplink traffic channel,
 an uplink control channel, and
 an uplink reference signal; and the second wireless communication node is at least one of: a core network, a base station, and a relay node.

7. The method of claim 1, further comprising selecting a preamble sequence from available preamble sequences that are determined based on at least one of: a semi-static configuration by a third wireless communication node and a system pre-definition, wherein:

the available preamble sequences are grouped into a plurality of preamble sets each of which corresponds to a respective one of different indication ranges of the indication information, based on at least one of: the semi-static configuration by a third wireless communication node and the system pre-definition;

the indication information is transmitted by the preamble sequence that corresponds to an indication range of the indication information; and the second wireless communication node is at least one of: a core network, a base station, and a relay node.

8. A method performed by a first wireless communication node, the method comprising:

receiving indication information from a second wireless communication node, in connection with an establishment of a first link between the first wireless communication node and the second wireless communication node, for determining at least one transmission resource configuration to be used on the first link, wherein the indication information comprises information about at least one of the following:
 a multiplexing mode indication, wherein the multiplexing mode indication indicates at least one multiplexing mode supported by the first link, and at least one multiplexing mode desired by the second wireless communication node; and
 a space domain resource indication, wherein the space domain resource indication indicates: at least one space domain resource configuration supported by the first link, and at least one space domain resource configuration desired by the second wireless communication node;

wherein the multiplexing mode indication indicates, based on an available multiplexing mode set, at least one of or a combination of at least two of the following multiplexing modes:
 time division multiplexing (TDM),
 frequency division multiplexing (FDM), and
 space division multiplexing (SDM); and wherein the available multiplexing mode set is determined based on at least one of: a semi-static configuration by a third wireless communication node and a system pre-definition.

9. The method of claim 8, wherein:

the indication information further comprises information about at least one of the following:
 the first wireless communication node, the second wireless communication node, and the first link;
 a time domain resource indication, wherein the time domain resource indication indicates: at least one time domain resource configuration supported by the first link, and at least one time domain resource configuration desired by the first second wireless communication node;
 a frequency domain resource indication, wherein the frequency domain resource indication indicates: at least one frequency domain resource configuration supported by the first link, and at least one frequency domain resource configuration desired by the second wireless communication node; and
 a node type indication, wherein the node type indication indicates at least one of:
 a node type of the first wireless communication node, and
 a node type of the second wireless communication node.

10. The method of claim 8, wherein:

the multiplexing mode indication indicates, based on an available multiplexing mode set, at least one of or a combination of at least two of the following multiplexing modes:
 time division multiplexing (TDM),
 frequency division multiplexing (FDM), and
 space division multiplexing (SDM); and the available multiplexing mode set is determined based on at least one of: a semi-static configuration by a third wireless communication node and a system pre-definition.

11. The method of claim 9, wherein:

the time domain resource indication indicates, based on an available time domain resource set, one or more consecutive or non-continuous time domain resource units that include at least one of the following: a radio frame, a half-frame, a sub-frame, a time slot, a mini-slot, an orthogonal frequency-division multiplexing (OFDM) symbol and an OFDM symbol cluster; and the available time domain resource set is determined based on at least one of: a semi-static configuration by a third wireless communication node and a system pre-definition.

12. The method of claim 9, wherein:

the frequency domain resource indication indicates, based on an available frequency domain resource set, one or more consecutive or non-continuous frequency domain resource units that include at least one of the following: a carrier, a sub-carrier, a bandwidth part, a resource block (RB), a resource block group (RBG), a physical resource block (PRB), and a contiguously-allocated resource block (CRB); and the available frequency domain resource set is determined based on at least one of: a semi-static configuration by a third wireless communication node and a system pre-definition.

13. The method of claim 9, wherein:

the space domain resource indication indicates, based on an available space domain resource set, one or more consecutive or non-continuous space domain resource units that include at least one of the following: a beam direction, a quasi-co-location (QCL) reference signal set of a downlink reference signal, and a second reference signal set of an uplink reference signal with respect to spatial domain transmission filter; and the available space domain resource set is determined based on at least one of: a semi-static configuration by a third wireless communication node and a system pre-definition.

14. The method of claim 8, wherein:

the indication information is transmitted through at least one of:
- a message from the second wireless communication node to the first wireless communication node during a random access process for the establishment of the first link,
- an uplink traffic channel,
- an uplink control channel, and
- an uplink reference signal; and the first wireless communication node is at least one of: a core network, a base station, and a relay node.

15. The method of claim 8, wherein:

a preamble sequence is selected from available preamble sequences that are determined based on at least one of: a semi-static configuration by a third wireless communication node and a system pre-definition;

the available preamble sequences are grouped into a plurality of preamble sets each of which corresponds to a respective one of different indication ranges of the indication information, based on at least one of: the semi-static configuration by a third wireless communication node and the system pre-definition;

the indication information is transmitted by the preamble sequence that corresponds to an indication range of the indication information; and the first wireless communication node is at least one of: a core network, a base station, and a relay node.

* * * * *